(12) United States Patent
Zhang et al.

(10) Patent No.: US 10,992,445 B2
(45) Date of Patent: *Apr. 27, 2021

(54) SIGNAL PROCESSING METHOD AND DEVICE

(71) Applicant: Huawei Technologies Co., Ltd., Shenzhen (CN)

(72) Inventors: Wen Zhang, Shenzhen (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,234

(22) Filed: Jul. 19, 2019

(65) Prior Publication Data
US 2019/0342063 A1 Nov. 7, 2019

Related U.S. Application Data

(63) Continuation of application No. 15/918,773, filed on Mar. 12, 2018, now Pat. No. 10,382,187, which is a
(Continued)

(51) Int. Cl.
*H04L 5/14* (2006.01)
*H04L 5/00* (2006.01)
(Continued)

(52) U.S. Cl.
CPC .............. *H04L 5/14* (2013.01); *H04B 1/7156* (2013.01); *H04L 5/00* (2013.01); *H04L 5/005* (2013.01);
(Continued)

(58) Field of Classification Search
CPC ......... H04L 5/00; H04L 5/005; H04L 5/0007; H04L 5/0048; H04L 5/0091;
(Continued)

(56) References Cited

U.S. PATENT DOCUMENTS 8,116,271 B2 * 2/2012 Pi ..................... H04L 5/0053
370/329
8,625,403 B2 * 1/2014 Sun ..................... H04L 5/006
370/203
(Continued)

FOREIGN PATENT DOCUMENTS

CN       1905406 A     1/2007
CN     101079665 A    11/2007
(Continued)

OTHER PUBLICATIONS

U.S. Appl. No. 14/751,755, filed Jun. 26, 2015.
(Continued)

*Primary Examiner* — Kevin D Mew
(74) *Attorney, Agent, or Firm* — Leydig, Voit & Mayer, Ltd.

(57) ABSTRACT

The present disclosure provides a signal processing method and device. The method includes: sending a first data signal and receiving a second data signal in a first Resource Block (RB) of a first subframe; and further sending a first reference signal according to first reference information and receiving a second reference signal according to second reference information in the first RB, where: the first reference information is different from the second reference information; the first reference information includes: a time-frequency resource location occupied by the first reference signal, and sequence information of the first reference signal; and the second reference information includes: a time-frequency resource location occupied by the second reference signal, and sequence information of the second reference signal. The present disclosure ensures correct receiving of the reference signal.

20 Claims, 4 Drawing Sheets

Send a first data signal and receive a second data signal in a first resource block RB of a first subframe — 101

Further send a first reference signal according to first reference information and receive a second reference signal according to second reference information in the first RB, where the first reference information is different from the second reference information — 102

Related U.S. Application Data continuation of application No. 14/751,755, filed on Jun. 26, 2015, now Pat. No. 9,948,445, which is a continuation of application No. PCT/CN2012/087652, filed on Dec. 27, 2012.

(51) Int. Cl.
  *H04B 1/7156* (2011.01)
  *H04L 27/26* (2006.01)
  *H04B 1/76* (2006.01)
  *H04W 88/08* (2009.01)

(52) U.S. Cl.
  CPC .......... *H04L 5/0048* (2013.01); *H04L 27/261* (2013.01); *H04B 1/76* (2013.01); *H04B 2001/71563* (2013.01); *H04L 5/0007* (2013.01); *H04L 5/0091* (2013.01); *H04L 5/0092* (2013.01); *H04W 88/08* (2013.01)

(58) Field of Classification Search
  CPC ....... H04L 5/0092; H04L 5/14; H04B 1/7156; H04B 1/76; H04B 2001/71563; H04W 88/08
  See application file for complete search history.

(56) References Cited

U.S. PATENT DOCUMENTS

| | | | |
|---|---|---|---|
| 8,929,319 | B2 | 1/2015 | Anderson et al. |
| 9,020,516 | B2 | 4/2015 | Abe et al. |
| 2008/0075184 | A1 | 3/2008 | Muharemovic et al. |
| 2009/0046570 | A1 | 2/2009 | Sarkar et al. |
| 2009/0046582 | A1* | 2/2009 | Sarkar ............... H04B 7/043 370/230.1 |
| 2010/0008282 | A1 | 1/2010 | Bhattad et al. |
| 2010/0173625 | A1 | 7/2010 | Noh et al. |
| 2010/0195599 | A1* | 8/2010 | Zhang ............... H04L 5/0053 370/329 |
| 2011/0128909 | A1 | 6/2011 | Luo et al. |
| 2011/0134901 | A1 | 6/2011 | Hoshino et al. |
| 2011/0141982 | A1 | 6/2011 | Zhang et al. |
| 2011/0176466 | A1* | 7/2011 | Lindoff ............ H04W 52/0225 370/311 |
| 2011/0228877 | A1 | 9/2011 | Han et al. |
| 2012/0063369 | A1 | 3/2012 | Lin et al. |
| 2012/0106493 | A1* | 5/2012 | Noh ............... H04L 5/0007 370/329 |
| 2012/0113816 | A1 | 5/2012 | Bhattad et al. |
| 2012/0176885 | A1* | 7/2012 | Lee ............... H04L 5/0048 370/209 |
| 2012/0195390 | A1* | 8/2012 | Liu ............... H04L 5/0007 375/260 |
| 2012/0201149 | A1 | 8/2012 | Skärby et al. |
| 2012/0201220 | A1 | 8/2012 | Kim et al. |
| 2012/0238310 | A1* | 9/2012 | Xiao ............... H04W 52/34 455/522 |
| 2012/0307868 | A1 | 12/2012 | Zhou et al. |
| 2013/0157667 | A1 | 6/2013 | Nakamura et al. |
| 2013/0343340 | A1 | 12/2013 | Seo et al. |
| 2014/0016556 | A1 | 1/2014 | Shimezawa et al. |
| 2014/0269593 | A1 | 1/2014 | Wang et al. |
| 2014/0044061 | A1 | 2/2014 | Yue et al. |
| 2014/0198678 | A1 | 7/2014 | Kim et al. |
| 2014/0269519 | A1* | 9/2014 | Shan ............... H04L 5/0051 370/329 |
| 2014/0286185 | A1 | 9/2014 | Liu et al. |
| 2014/0376461 | A1 | 12/2014 | Park et al. |
| 2015/0029958 | A1 | 1/2015 | Park et al. |
| 2015/0049704 | A1 | 2/2015 | Park et al. |
| 2015/0155993 | A1* | 6/2015 | Berggren ............ H04L 5/0023 370/330 |
| 2015/0200762 | A1 | 7/2015 | Kim et al. |
| 2016/0044681 | A1 | 2/2016 | Zhou et al. |

FOREIGN PATENT DOCUMENTS

| | | |
|---|---|---|
| CN | 102090128 A | 6/2011 |
| CN | 102158449 A | 8/2011 |
| EP | 2536087 A1 | 12/2012 |

OTHER PUBLICATIONS

U.S. Appl. No. 15/918,773, filed Mar. 12, 2018.

"3rd Generation Partnership Project; Technical Specification Group Radio Access Network; NR; Multiplexing and channel coding (Release 15)," 3GPP TS 38.212 V15.0.0, total 82 pages, 3rd Generation Partnership Project, Valbonne, France (Dec. 2017).

* cited by examiner

SIGNAL PROCESSING METHOD AND DEVICE

CROSS-REFERENCE TO RELATED APPLICATIONS

This application is a continuation of U.S. patent application Ser. No. 15/918,773, filed on Mar. 12, 2018, which is a continuation of U.S. patent application Ser. No. 14/751,755, filed on Jun. 26, 2015, now U.S. Pat. No. 9,948,445, which is a continuation of International Application No. PCT/CN2012/087652, filed on Dec. 27, 2012. All of the aforementioned patent applications are hereby incorporated by reference in their entireties.

TECHNICAL FIELD

Embodiments of the present disclosure relate to communications technologies, and in particular, to a signal processing method and device.

BACKGROUND

With rapid development of high-speed mobile Internet technologies, various wireless broadband access technologies emerge one after another, for example, a Long Term Evolution (LTE) system, and an LTE-Advanced (LTE-A) system. In these systems, using a same time and frequency resource, data can only be received or sent between a base station and a user equipment, but cannot be received and sent simultaneously. For example, in a frequency division duplex (FDD) system, a base station uses different frequency resources to separately send data to a user and receive data. With evolution of the wireless broadband access technologies, in order to further improve system capacity using a limited spectrum resource, a full-duplex communication method is discussed and put forward at present, which supports simultaneous data receiving and sending between devices using a same time and frequency resource, that is, on a same carrier. A device that uses this sending manner may be referred to as a full-duplex device.

However, because the full-duplex device simultaneously receives and sends data on the same carrier, the following problem may occur: a reference signal used for demodulating data is sent while data is sent, and interference occurs between the sent reference signal and a received reference signal. Consequently, correct receiving of the reference signal is affected and correct demodulation of the data cannot be ensured.

SUMMARY

The present disclosure provides a signal processing method and device, so as to implement that a full-duplex device correctly receives a reference signal.

According to a first aspect, a signal processing method is provided, including:

sending a first data signal and receiving a second data signal in a first resource block (RB) of a first subframe; and further sending a first reference signal according to first reference information and receiving a second reference signal according to second reference information in the first RB, where the first reference signal is used for demodulating the first data signal, the second reference signal is used for demodulating the second data signal, and the first reference information is different from the second reference information, where the first reference information includes: a time-frequency resource location occupied by the first reference signal, and sequence information of the first reference signal; and the second reference information includes: a time-frequency resource location occupied by the second reference signal, and sequence information of the second reference signal.

With reference to the first aspect, in a first possible implementation manner, that the first reference information is different from the second reference information includes that the time-frequency resource location occupied by the first reference signal is the same as the time-frequency resource location occupied by the second reference signal, and the sequence information of the first reference signal is different from the sequence information of the second reference signal.

With reference to the first aspect, in a second possible implementation manner, that the first reference information is different from the second reference information includes that the time-frequency resource location occupied by the first reference signal is different from the time-frequency resource location occupied by the second reference signal.

With reference to the first possible implementation manner of the first aspect, or the second possible implementation manner of the first aspect, in a third possible implementation manner, the sending a first data signal and receiving a second data signal uses time-frequency resources other than the time-frequency resource locations occupied by the first reference signal and the second reference signal.

With reference to the first aspect, the first possible implementation manner of the first aspect, the second possible implementation manner of the first aspect, or the third possible implementation manner of the first aspect, in a fourth possible implementation manner, the first reference information and the second reference information are preset.

With reference to the first aspect, the first possible implementation manner of the first aspect, the second possible implementation manner of the first aspect, or the third possible implementation manner of the first aspect, in a fifth possible implementation manner, before the sending a first data signal and receiving a second data signal, the method further includes: receiving at least one piece of the following information sent by a base station: the time-frequency resource location occupied by the first reference signal, the sequence information of the first reference signal, the time-frequency resource location occupied by the second reference signal, and the sequence information of the second reference signal.

With reference to the fifth possible implementation manner of the first aspect, in a sixth possible implementation manner, the sequence information of the first reference signal received from the base station is a cyclic shift of a sequence of the first reference signal, and after receiving the cyclic shift of the sequence of the first reference signal from the base station, the method further includes:

obtaining a cyclic shift of a sequence of the second reference signal by calculation according to the cyclic shift of the sequence of the first reference signal and preset relationship information;

or the sequence information of the second reference signal received from the base station is a cyclic shift of a sequence of the second reference signal, and after receiving the cyclic shift of the sequence of the second reference signal from the base station, the method further includes:

obtaining a cyclic shift of a sequence of the first reference signal by calculation according to the cyclic shift of the sequence of the second reference signal and preset relationship information;

or the time-frequency resource location occupied by the first reference signal is received from the base station, and after receiving the time-frequency resource location occupied by the first reference signal, the method further includes:

obtaining the time-frequency resource location occupied by the second reference signal by calculation according to the time-frequency resource location occupied by the first reference signal and preset relationship information;

or the time-frequency resource location occupied by the second reference signal is received from the base station, and after receiving the time-frequency resource location occupied by the second reference signal, the method further includes:

obtaining the time-frequency resource location occupied by the first reference signal by calculation according to the time-frequency resource location occupied by the second reference signal and preset relationship information.

According to a second aspect, a signal processing device is provided, including:

a transceiving unit, configured to: send a first data signal and receive a second data signal in a first RB of a first subframe; and further send a first reference signal according to first reference information and receive a second reference signal according to second reference information in the first RB, where the first reference signal is used for demodulating the first data signal, the second reference signal is used for demodulating the second data signal, and the first reference information is different from the second reference information; and a demodulating unit, configured to demodulate the second data signal according to the second reference signal received by the transceiving unit;

where the first reference information includes: a time-frequency resource location occupied by the first reference signal, and sequence information of the first reference signal; and the second reference information includes: a time-frequency resource location occupied by the second reference signal, and sequence information of the second reference signal.

With reference to the second aspect, in a first possible implementation manner, that the first reference information is different from the second reference information includes that the time-frequency resource location occupied by the first reference signal is the same as the time-frequency resource location occupied by the second reference signal, and the sequence information of the first reference signal is different from the sequence information of the second reference signal.

With reference to the second aspect, in a second possible implementation manner, that the first reference information is different from the second reference information includes that the time-frequency resource location occupied by the first reference signal is different from the time-frequency resource location occupied by the second reference signal.

With reference to the first possible implementation manner of the second aspect, or the second possible implementation manner of the second aspect, in a third possible implementation manner, the transceiving unit is specifically configured to send the first data signal and receive the second data signal by using time-frequency resources other than the time-frequency resource locations occupied by the first reference signal and the second reference signal.

With reference to the second aspect, the first possible implementation manner of the second aspect, the second possible implementation manner of the second aspect, or the third possible implementation manner of the second aspect, in a fourth possible implementation manner, when the signal processing device is a user equipment, the transceiving unit is further configured to receive at least one piece of the following information sent by a base station: the time-frequency resource location occupied by the first reference signal, the sequence information of the first reference signal, the time-frequency resource location occupied by the second reference signal, and the sequence information of the second reference signal.

With reference to the fourth possible implementation manner of the second aspect, in a fifth possible implementation manner, the sequence information of the first reference signal received by the transceiving unit from the base station is a cyclic shift of a sequence of the first reference signal; or the sequence information of the second reference signal received by the transceiving unit from the base station is a cyclic shift of a sequence of the second reference signal; or the transceiving unit receives the time-frequency resource location occupied by the first reference signal from the base station; or the transceiving unit receives the time-frequency resource location occupied by the second reference signal from the base station; and the signal processing device further includes: a calculating unit, where the calculating unit is configured to:

when the transceiving unit receives the cyclic shift of the sequence of the first reference signal, obtain a cyclic shift of a sequence of the second reference signal by calculation according to the cyclic shift of the sequence of the first reference signal and preset relationship information;

or when the transceiving unit receives the cyclic shift of the sequence of the second reference signal, obtain a cyclic shift of a sequence of the first reference signal by calculation according to the cyclic shift of the sequence of the second reference signal and preset relationship information;

or when the transceiving unit receives the time-frequency resource location occupied by the first reference signal, obtain the time-frequency resource location occupied by the second reference signal by calculation according to the time-frequency resource location occupied by the first reference signal and preset relationship information;

or when the transceiving unit receives the time-frequency resource location occupied by the second reference signal, obtain the time-frequency resource location occupied by the first reference signal by calculation according to the time-frequency resource location occupied by the second reference signal and preset relationship information.

According to a third aspect, a signal processing device is provided, including:

a transceiver, configured to: send a first data signal and receive a second data signal in a first RB of a first subframe; and further send a first reference signal according to first reference information and receive a second reference signal according to second reference information in the first RB, where the first reference signal is used for demodulating the first data signal, the second reference signal is used for demodulating the second data signal, and the first reference information is different from the second reference information; and a processor, configured to demodulate the second data signal according to the second reference signal received by the transceiver;

where the first reference information includes: a time-frequency resource location occupied by the first reference signal, and sequence information of the first reference signal; and the second reference information includes: a time-frequency resource location occupied by the second reference signal, and sequence information of the second reference signal.

With reference to the third aspect, in a first possible implementation manner, when the transceiver is specifically configured to send the first reference signal and receive the second reference signal, the time-frequency resource location occupied by the first reference signal is the same as the time-frequency resource location occupied by the second reference signal, and the sequence information of the first reference signal is different from the sequence information of the second reference signal.

With reference to the third aspect, in a second possible implementation manner, when the transceiver is specifically configured to send the first reference signal and receive the second reference signal, the time-frequency resource location occupied by the first reference signal is different from the time-frequency resource location occupied by the second reference signal.

With reference to the first possible implementation manner of the third aspect, or the second possible implementation manner of the third aspect, in a third possible implementation manner, the transceiver is specifically configured to send the first data signal and receive the second data signal by using time-frequency resources other than the time-frequency resource locations occupied by the first reference signal and the second reference signal.

With reference to the third aspect, the first possible implementation manner of the third aspect, the second possible implementation manner of the third aspect, or the third possible implementation manner of the third aspect, in a fourth possible implementation manner, the signal processing device is a user equipment or a base station.

With reference to the fourth possible implementation manner of the third aspect, in a fifth possible implementation manner, when the signal processing device is a user equipment, the transceiver is further configured to receive at least one piece of the following information sent by a base station: the time-frequency resource location occupied by the first reference signal, the sequence information of the first reference signal, the time-frequency resource location occupied by the second reference signal, and the sequence information of the second reference signal.

With reference to the fifth possible implementation manner of the third aspect, in a sixth possible implementation manner, the processor is further configured to: when the sequence information of the first reference signal received by the transceiver from the base station is a cyclic shift of a sequence of the first reference signal, obtain a cyclic shift of a sequence of the second reference signal by calculation according to the cyclic shift of the sequence of the first reference signal and preset relationship information;

or is configured to: when the sequence information of the second reference signal received by the transceiver from the base station is a cyclic shift of a sequence of the second reference signal, obtain a cyclic shift of a sequence of the first reference signal by calculation according to the cyclic shift of the sequence of the second reference signal and preset relationship information;

or is configured to: when the transceiver receives the time-frequency resource location occupied by the first reference signal from the base station, obtain the time-frequency resource location occupied by the second reference signal by calculation according to the time-frequency resource location occupied by the first reference signal and preset relationship information;

or is configured to: when the transceiver receives the time-frequency resource location occupied by the second reference signal from the base station, obtain the time-frequency resource location occupied by the first reference signal by calculation according to the time-frequency resource location occupied by the second reference signal and preset relationship information.

A technical effect of the signal processing method and device provided by the present disclosure is that: because a reference signal is sent and a reference signal is received according to different reference information, mutual interference does not occur between the received and sent reference signals even if the reference signals are simultaneously received and sent in a same RB, thereby ensuring that a full-duplex device receives correctly a reference signal.

DESCRIPTION OF EMBODIMENTS

Embodiment 1

Figure 1:
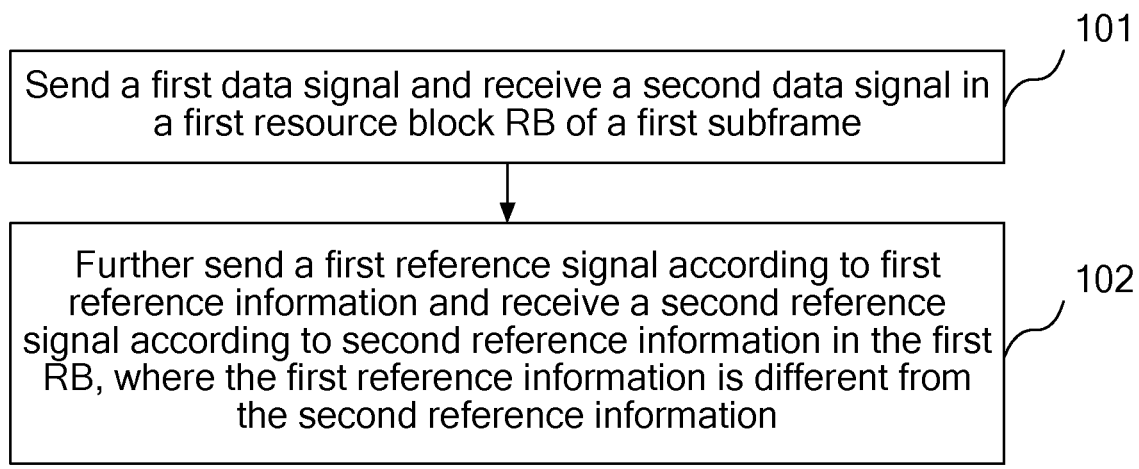
FIG. 1 is a schematic flowchart of an embodiment of a signal processing method according to the present disclosure.

FIG. 1 is a schematic flowchart of an embodiment of a signal processing method according to the present disclosure. The method may be executed by, for example, a user equipment (UE) or a base station, such as an evolved Node B (eNB), as shown in FIG. 1, and may include:

101. Send a first data signal and receive a second data signal in a first resource block RB of a first subframe.

The first subframe is a subframe in a time domain, and the first RB is an RB corresponding to the first subframe, that is, the first RB is a time domain corresponding to the first subframe in terms of the time domain, and is 12 subcarriers in terms of a frequency domain. A resource that the base station allocates to the UE for communication may be multiple RBs, and transmission modes (the transmission modes refer to transmission formats such as locations and sequences occupied for transmission of reference signals and data signals in this embodiment of the present disclosure) used by all the RBs may be the same. Therefore, this embodiment of the present disclosure merely uses the transmission mode of one RB as an example for description.

The first RB includes multiple resource elements REs. For example, some REs are used for transmitting data signals, and some REs are used for transmitting reference signals. It is described in this embodiment that the first RB has such an RE as follows: data signals are sent and received on the RE; this includes a case in which all REs in the first RB except the REs used for transmitting reference signals use the forgoing manner (that is, both sending and receiving data signals), and also includes a case in which only some REs in the first RB use the foregoing manner.

In the following description, because the first RB is an RB corresponding to the first subframe, for ease of reference, the first RB is directly referred as the RB for short.

102. Further send a first reference signal according to first reference information and receive a second reference signal according to second reference information in the first RB, where the first reference information is different from the second reference information.

The first reference signal is used for demodulating the first data signal, and is mainly for a receiving party of the first data signal to perform demodulation according to the first reference signal to obtain the first data signal; the second reference signal is used for demodulating the second data signal, and is mainly for a receiving party of the second data signal (that is, a device that executes the method of this embodiment) to perform demodulation to obtain the second data signal.

It should be noted that an execution sequence of 101 and 102 of this embodiment is not limited, and in fact, a data signal and a reference signal are sent together in a same RB.

The first reference information includes: a time-frequency resource location occupied by the first reference signal, and sequence information of the first reference signal; the second reference information includes: a time-frequency resource location occupied by the second reference signal, and sequence information of the second reference signal.

For example, the first reference information may be the time-frequency resource location of the first reference signal in the RB and the sequence information of the first reference signal, and the first reference signal may be sent according to the time-frequency resource location and the sequence information; the second reference information may be the time-frequency resource location of the second reference signal in the RB and the sequence information of the second reference signal, and the second reference signal may be sent according to the time-frequency resource location and the sequence information.

The first reference information is different from the second reference information. For example, it may be that the time-frequency resource location of the first reference signal in the RB is different from the time-frequency resource location of the second reference signal in the RB, or the time-frequency resource location of the first reference signal in the RB is the same as the time-frequency resource location of the second reference signal in the RB, but the sequence information of the first reference signal is different from the sequence information of the second reference signal, where the sequence information being different includes a case of same root sequences but different cyclic shifts.

In the signal processing method of this embodiment, because a reference signal is sent and a reference signal is received according to different reference information, mutual interference does not occur between the received and sent reference signals even if the reference signals are simultaneously received and sent in a same RB. Therefore, it is ensured that the reference signal is correctly received, and it can further be ensured that a data signal is correctly demodulated.

Sending and receiving manners of the reference signals are described in detail by using the following several embodiments.

Embodiment 2

In this embodiment, a first reference signal sent and a second reference signal received occupy a same resource location in an RB, but have different sequence information.

Figure 2:
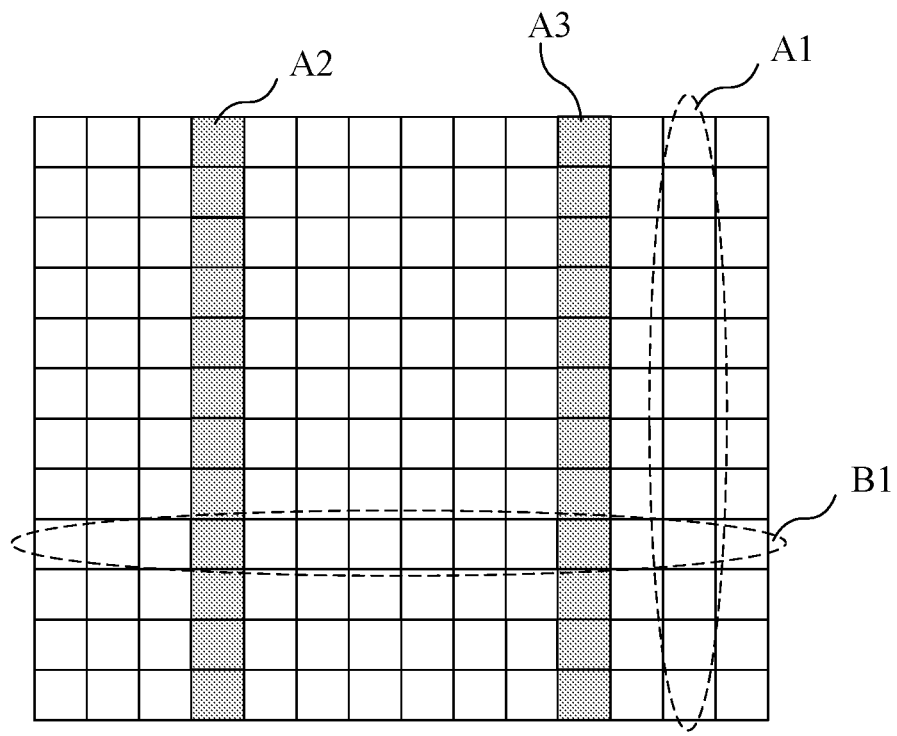
FIG. 2 is schematic diagram 1 of reference signal distribution in another embodiment of a signal processing method according to the present disclosure.

FIG. 2 is schematic diagram 1 of reference signal distribution in another embodiment of a signal processing method according to the present disclosure. FIG. 2 shows the reference signal distribution of one of RBs.

In this embodiment, FIG. 2 shows a resource block (RB) in a Long Term Evolution (LTE) system, where: horizontal coordinates represent 14 orthogonal frequency dividing multiplexing (OFDM) symbols in a time domain, for example, a column indicated by A1 shown in FIG. 2 represents an OFDM symbol; vertical coordinates represent 12 subcarriers in a frequency domain, for example, a row indicated by B1 shown in FIG. 2 represents a subcarrier.

It is assumed that both sending of the first reference signal and receiving of the second reference signal occupy OFDM symbols indicated by A2 and A3 shown in FIG. 2, that is, the second reference signal is received on the two OFDM symbols while the first reference signal is sent on the two OFDM symbols. The reference signals and data signals in this embodiment are in a time division manner, and the data signals are transmitted at time-frequency resource locations but not the OFDM symbols indicated by A2 and A3.

In the OFDM symbols occupied by the foregoing reference signals, reference information according to which a full-duplex device sends the first reference signal may be referred to as first reference information, and reference information according to which the full-duplex device receives the second reference signal may be referred to as second reference information. The reference information includes: a time-frequency resource location of the reference signal in the RB and the sequence information of the reference signal. In this embodiment, in order to avoid mutual interference between the first reference signal and the second reference signal, and to ensure correct receiving of the second reference signal, the first reference information and the second reference information designed in this embodiment are different; specifically, in a case in which the reference signals sent and received in this embodiment occupy the same time-frequency resource location, it is set that the sequence information of the first reference signal and the sequence information of the second reference signal are different.

For example, the first reference signal and the second reference signal may use different orthogonal sequences, or pseudo-orthogonal sequences, or non-orthogonal sequences, such as ZC sequences, M sequences, and m sequences, and specific implementation is not limited to these types of sequences. In addition, the first reference signal and the second reference signal may also use a same root sequence, but use different cyclic shifts; for example, the first reference signal and the second reference signal use a same ZC sequence as the root sequence, the cyclic shift of the first reference signal is a, and the cyclic shift of the second reference signal is b, where a and b are different.

Figure 3:
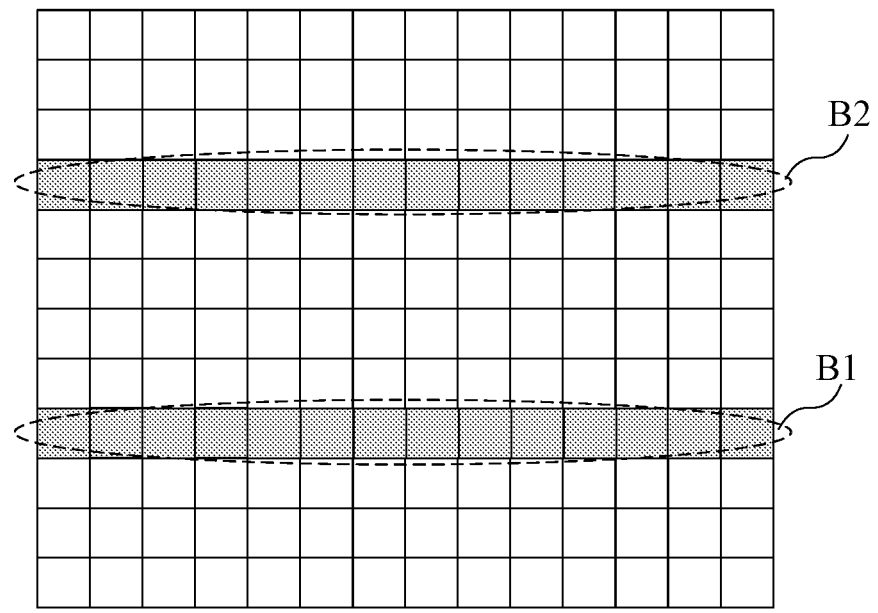
FIG. 3 is schematic diagram 2 of reference signal distribution in another embodiment of a signal processing method according to the present disclosure.

FIG. 3 is schematic diagram 2 of reference signal distribution in another embodiment of a signal processing method according to the present disclosure. Reference signals and data signals in FIG. 3 are in a frequency division manner. For example, sending and receiving of the reference signals occupy time-frequency resource rows corresponding to subcarriers indicated by B1 and B2, and sending and receiving of the data signals occupy time-frequency resources but not B1 and B2. Reference information according to which a first reference signal is sent and a second reference signal is received in FIG. 3 is also different, and a design manner of the reference information may be the same as the design of the reference information in FIG. 2, that is, sequences of the reference signals sent and received are different, which is not described in detail herein again.

Figure 4:
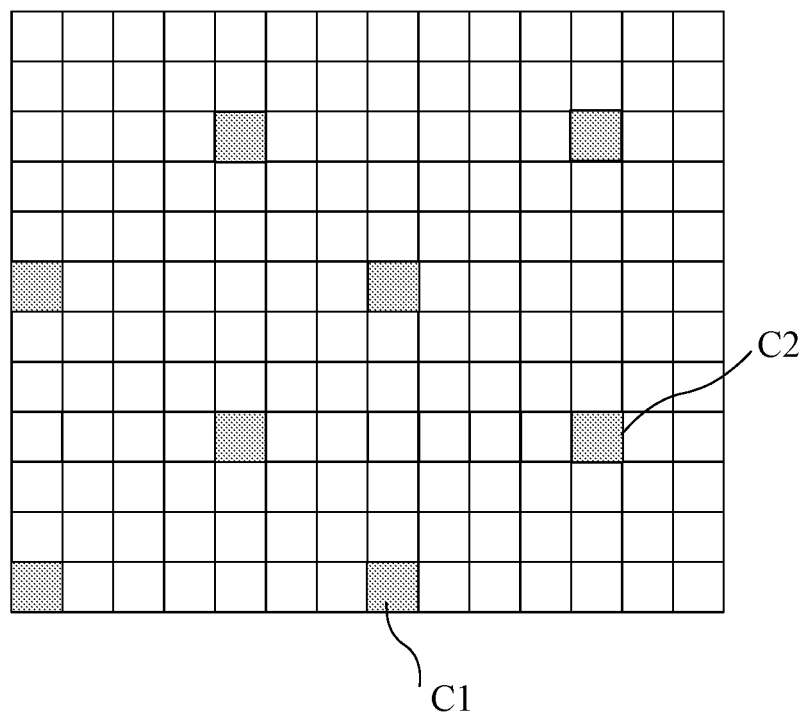
FIG. 4 is schematic diagram 3 of reference signal distribution in another embodiment of a signal processing method according to the present disclosure.

FIG. 4 is schematic diagram 3 of reference signal distribution in another embodiment of a signal processing method according to the present disclosure. A location relationship between reference signals and data signals in FIG. 4 is different from that in the foregoing two distribution manners. The reference signals are transmitted by means of puncturing, that is, time-frequency resource locations occupied by the reference signals are distributed in a dispersed manner. For example, sending and receiving of the reference signals occupy time-frequency resource locations indicated by C1, C2 and the like, and sending and receiving of the data signals occupy time-frequency resources other than C1, C2 and the like. Likewise, reference information according to which a first reference signal is sent and a second reference signal is received in FIG. 4 is also different, and specifically, sequences of the reference signals are different.

Optionally, in order to randomize interference, and to more effectively ensure correct receiving of the reference signal, it may be designed that an offset exists between time-frequency resource locations occupied by reference signals of different cells. For example, a reference signal occupies the second OFDM symbol in an RB of a first cell, a reference signal occupies the fourth OFDM symbol in an RB of a second cell, and so on. In addition, sequence information of the reference signal may also change along with an RB. For example, in all RBs of a cell, both a first reference signal sent and a second reference signal received occupy the second and the sixth OFDM symbols, but reference signals in different RBs have different sequence information: A cyclic shift of a sequence of a reference signal in a first RB is a, and a cyclic shift of a sequence of a reference signal in a second RB is b.

Embodiment 3

In this embodiment, a first reference signal sent and a second reference signal received occupy different time-frequency resource locations in an RB.

Figure 5:
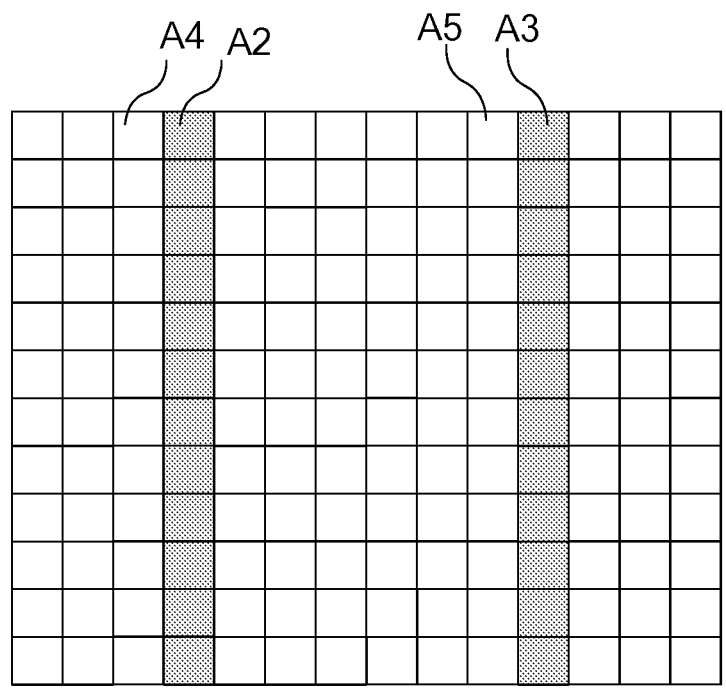
FIG. 5 is a schematic diagram of distribution of sent reference signals in still another embodiment of a signal processing method according to the present disclosure.
Figure 6:
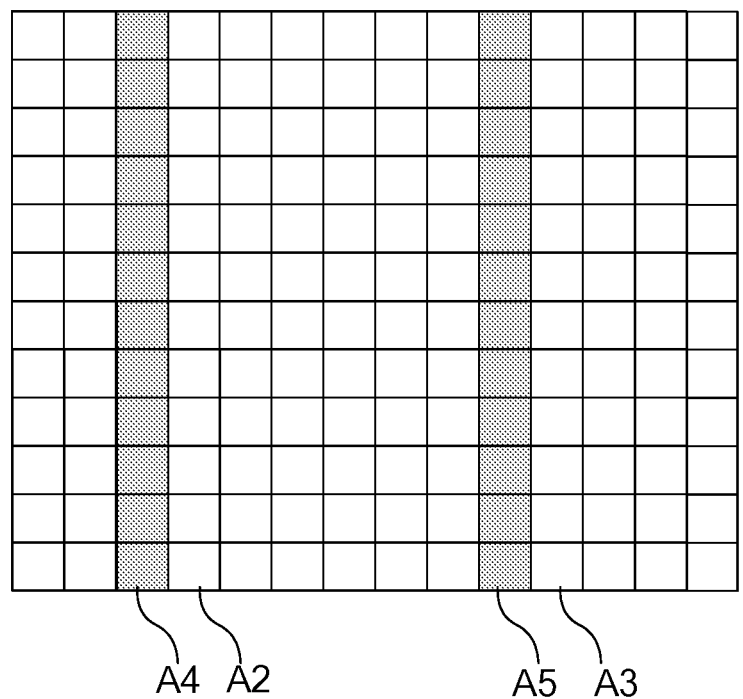
FIG. 6 is a schematic diagram of distribution of received reference signals in still another embodiment of a signal processing method according to the present disclosure.

FIG. 5 is a schematic diagram of distribution of sent reference signals in still another embodiment of a signal processing method according to the present disclosure. FIG. 6 is a schematic diagram of distribution of received reference signals in still another embodiment of a signal processing method according to the present disclosure. It is assumed that the first reference information is sent in OFDM symbols indicated by A2 and A3, and the second reference signal is received in OFDM symbols indicated by A4 and A5.

The first reference signal and the second reference signal occupy different time-frequency resources, which can avoid mutual interference between the first reference signal and the second reference signal. Therefore, sequence information of the first reference signal sent and sequence information of the second reference signal received may be the same or different. For example, the first reference signal uses a ZC sequence, and the second reference signal uses an m sequence. In addition, the foregoing reference signals may use any sequence, such as a ZC sequence, an M sequence, and an m sequence. The sequence information of the reference signals is not limited in this embodiment.

Time-frequency resource locations occupied by the reference signals and data signals may be in a time division manner in FIG. 2, may also be in a frequency division manner in FIG. 3, and may also be in a manner in FIG. 4, in which the reference signals are transmitted by means of puncturing only on some resource elements. Moreover, the resource locations occupied by the first reference signal sent and the second reference signal received may be in different relationships with the resource locations occupied by the data signals. For example, the first reference signal and the data signal are in the time division manner, and the second reference signal and the data signal are in the frequency division manner, which is not limited in this embodiment.

Optionally, in a case in which the first reference signal and the second reference signal in this embodiment occupy different time-frequency resource locations, in order to further ensure that the reference signals are not interfered, it is designed that the data signals are transmitted by means by puncturing at the time-frequency resource locations occupied by the reference signals, that is, sending and receiving of the data signals use time-frequency resources other than the time-frequency resource locations occupied by the first reference signal and the second reference signal. With reference to FIG. 5 and FIG. 6, the OFDM symbols occupied by A2, A3, A4, and A5 can be used for transmitting only the reference signals, and the data signals cannot be transmitted on these resource elements. The time-frequency resources occupied by the data signals are time-frequency resources other than the time-frequency resources occupied by the first reference signal and the second reference signal.

Embodiment 4

Reference information according to which a reference signal is sent or received in this embodiment of the present disclosure may be preset. For example, it is preset, on a UE or an eNB, a time-frequency resource location occupied by the reference signal, a sequence of the reference signal, and the like. For the UE, the reference information may also be notified by the base station to the UE. A manner in which the base station notifies the UE of the reference information is described in detail in this embodiment.

As described above, the reference information may include: a time-frequency resource location of the reference signal in an RB and sequence information of the reference signal. The UE may receive at least one piece of the following information from the base station: a time-frequency resource location occupied by a first reference signal, sequence information of the first reference signal, a time-frequency resource location occupied by a second reference signal, and sequence information of the second reference signal. The time-frequency resource location may be preset, or notified by the base station to the UE. For example, the UE may use 8 types of reference signal resource locations, and the base station may notify, by using 3 bits, the UE of which type to be used. Likewise, the sequence information of the reference signal may also be preset; or notified by the base station to the UE, where the notification, for example, is implemented by using higher layer signaling or a physical downlink control channel (PDCCH); and may also be calculated by the UE according to a formula.

Specifically, the sequence information of the reference signal may be determined by a root sequence and a cyclic shift together. Information about the root sequence may be preset, or notified by the base station, and the cyclic shift may also be preset, or notified by the base station. For example, the base station may notify the UE of "0111", where the first two bits "01" indicate that a cyclic shift of the first reference signal sent is 1, and last two bits "11" indicate that a cyclic shift of the second reference signal received is 3; or a differential manner may also be used, and for "0111", the first two bits "01" indicate that a cyclic shift of the first reference signal sent is 1, and the last two bits "11" indicate that a cyclic shift of the second reference signal is the cyclic shift of the first reference signal plus 3, that is, 4.

For another example, for the two reference signals sent and received by the UE, the base station may also indicate only a cyclic shift of one of the reference signals, and a cyclic shift of the other of the reference signals may be preset, or have a fixed relationship with the notified cyclic shift of the reference signal, that is, preset relationship information. For example, a cyclic shift of the first reference signal indicated by the base station is "01". After receiving the information, the UE obtains a cyclic shift of a sequence of the second reference signal by calculation according to the preset relationship information: (cyclic shift of first reference signal+n) mod N=cyclic shift of second reference signal, where, for example, n=3, N is a constant, and n and N may be preset, or notified by the base station, which is not limited in the present disclosure. Likewise, the base station may also indicate only the cyclic shift of the sequence of the second reference signal, and the UE obtains a cyclic shift of a sequence of the first reference signal by calculation according to the cyclic shift and the preset relationship information.

The preset relationship information may be a pairing relationship between the cyclic shifts of the sequences of the two reference signals. For example, a cyclic shift being 1 is paired with a cyclic shift being 3. When the base station notifies the UE that the cyclic shift of the first reference signal sent is 1, the cyclic shift of the second reference signal received is 3. Alternatively, when the base station notifies the UE that the cyclic shift of the first reference signal sent is 3, the cyclic shift of the second reference signal received is 1.

For example, for the two reference signals sent and received by the UE, the base station may indicate only the sequence of one of the reference signals, and the sequence of the other reference signal may be preset, or notified by the base station; the sequence herein may be a root sequence. The sequences of the two reference signals sent and received by the UE may be, for example, from two sets. Sequences from the two sets have relatively low cross correlation, while sequences in each set have relatively high cross correlation, which can further effectively avoid interference between sending and receiving of the reference signals. The cyclic shifts of the sequences of the two reference signals may be preset, and may also be notified by the base station, and a notification method for the cyclic shifts is similar to that described in the previous paragraph.

Similarly, for time-frequency resource locations occupied when the UE receives reference signals from the base station, the base station may also indicate only a time-frequency resource location of one of the reference signals, and a time-frequency resource location of the other of the reference signals may have a fixed relationship with the notified time-frequency resource location of the reference signal, that is, preset relationship information; the time-frequency resource location of the other of the reference signals is obtained by calculation according to the notified time-frequency resource location of the one of the reference signals and the preset relationship information.

For example, the sequences of the reference signals may be preset. The base station needs to notify the UE only of the time-frequency resource locations occupied by the first reference signal and the second reference signal. If each of the first reference signal and the second reference signal occupies two OFDM symbols separately, and spacing between the two OFDM symbols occupied is 7 OFDM signals, then for each of the two reference signals, 7 locations are available for selection, that is, OFDM symbols {0, 7}, {1, 8}, {2, 9}, {3, 10}, {4, 11}, {5, 12}, and {6, 13}. In this case, the time-frequency resource location of the reference signal sent and the time-frequency resource location of the reference signal received may be separately indicated to the UE by using 3 bits. Alternatively, only the location of one of the reference signals is indicated, and the location of the other of the reference signals is represented by using an offset value so as to save bits. Alternatively, only the location of one of the reference signals is indicated, and the location of the other of the reference signals has a fixed relationship with the notified location of the reference signal, that is, preset relationship information, for example, (location number of reference signal sent+n) mod N, where, for example, n=3, and N is a constant, for example 7, which is not limited in the present disclosure. Alternatively, pairing between the locations of the first reference signal and the second reference signal is preset. For example, {0, 7} and {3, 10} form a pair; in this case, if the base station indicates to the UE that the time-frequency resource location occupied by the first reference signal sent is {0, 7}, the time-frequency resource location occupied by the second reference signal received is {3, 10}.

No matter whether the two reference signals sent and received occupy a same time-frequency resource location, the time-frequency resource location occupied by the reference signal and/or the sequence information of the reference signal may be preset, or notified by the base station.

For example, in a device-to-device communication (D2D) scenario, the method described above may be used in both design and a notification manner of reference signals of a full-duplex device; further, for example, in the D2D scenario, an eNB may notify both UEs in D2D, and may also notify only one UE while sending and receiving of reference signals of the other UE are preset.

Embodiment 5

Figure 7:
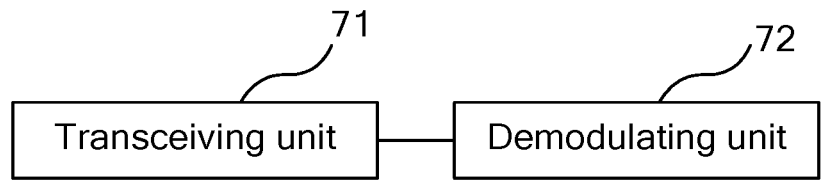
FIG. 7 is a schematic structural diagram of an embodiment of a signal processing device according to the present disclosure.

FIG. 7 is a schematic structural diagram of an embodiment of a signal processing device according to the present disclosure. The device can execute the method of any foregoing embodiment of the present disclosure. For example, the device may be a UE or an eNB. As shown in FIG. 7, the device of this embodiment may include: a transceiving unit 71 and a demodulating unit 72.

The transceiving unit 71 is configured to: send a first data signal and receive a second data signal in a first RB of a first subframe; and further send a first reference signal according to first reference information and receive a second reference signal according to second reference information in the first RB, where the first reference signal is used for demodulating the first data signal, the second reference signal is used for demodulating the second data signal, and the first reference information is different from the second reference information.

For meanings of the first subframe and the first RB, reference may be made to the description of step 101 in Embodiment 1 of the present disclosure, which is not described herein again.

The demodulating unit 72 is configured to demodulate the second data signal according to the second reference signal received by the transceiving unit.

The first reference information includes: a time-frequency resource location occupied by the first reference signal, and sequence information of the first reference signal; the second reference information includes: a time-frequency resource location occupied by the second reference signal, and sequence information of the second reference signal.

Further, that the first reference information is different from the second reference information includes that the time-frequency resource location occupied by the first reference signal is the same as the time-frequency resource location occupied by the second reference signal, and the sequence information of the first reference signal is different from the sequence information of the second reference signal.

Further, that the first reference information is different from the second reference information includes that the time-frequency resource location occupied by the first reference signal is different from the time-frequency resource location occupied by the second reference signal.

For specific examples of the first reference information being different from the second reference information, reference may be made to the descriptions in Embodiment 2 to Embodiment 4 of the present disclosure, which is not described herein again.

Further, the transceiving unit 71 is specifically configured to send the first data signal and receive the second data signal by using time-frequency resources other than the time-frequency resource locations occupied by the first reference signal and the second reference signal. With reference to FIG. 5 and FIG. 6, the OFDM symbols occupied by A2, A3, A4, and A5 can be used for transmitting only the reference signals, and the data signals cannot be transmitted on these resource elements. The time-frequency resources occupied by the data signals are time-frequency resources other than time-frequency resources occupied by the first reference signal and the second reference signal.

Figure 8:
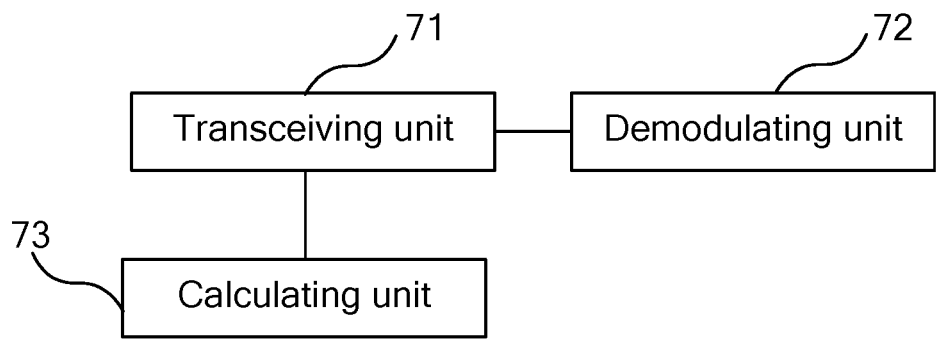
FIG. 8 is a schematic structural diagram of another embodiment of a signal processing device according to the present disclosure.

FIG. 8 is a schematic structural diagram of another embodiment of a signal processing device according to the present disclosure. As shown in FIG. 8, on the basis of the structure shown in FIG. 7, when the signal processing device is a user equipment, the transceiving unit 71 is further configured to receive at least one piece of the following information sent by a base station: the time-frequency resource location occupied by the first reference signal, the sequence information of the first reference signal, the time-frequency resource location occupied by the second reference signal, and the sequence information of the second reference signal.

Optionally, the sequence information of the first reference signal received by the transceiving unit 71 from the base station is a cyclic shift of a sequence of the first reference signal, or the sequence information of the second reference signal received by the transceiving unit 71 from the base station is a cyclic shift of a sequence of the second reference signal, or the transceiving unit 71 receives the time-frequency resource location occupied by the first reference signal from the base station, or the transceiving unit 71 receives the time-frequency resource location occupied by the second reference signal from the base station.

The signal processing device may further include a calculating unit 73, configured to: when the transceiving unit 71 receives the cyclic shift of the sequence of the first reference signal, obtain a cyclic shift of a sequence of the second reference signal by calculation according to the cyclic shift of the sequence of the first reference signal and preset relationship information; or when the transceiving unit 71 receives the cyclic shift of the sequence of the second reference signal, obtain a cyclic shift of a sequence of the first reference signal by calculation according to the cyclic shift of the sequence of the second reference signal and preset relationship information; or when the transceiving unit 71 receives the time-frequency resource location occupied by the first reference signal, obtain the time-frequency resource location occupied by the second reference signal by calculation according to the time-frequency resource location occupied by the first reference signal and preset relationship information; or when the transceiving unit 71 receives the time-frequency resource location occupied by the second reference signal, obtain the time-frequency resource location occupied by the first reference signal by calculation according to the time-frequency resource location occupied by the second reference signal and preset relationship information.

Embodiment 6

Figure 9:
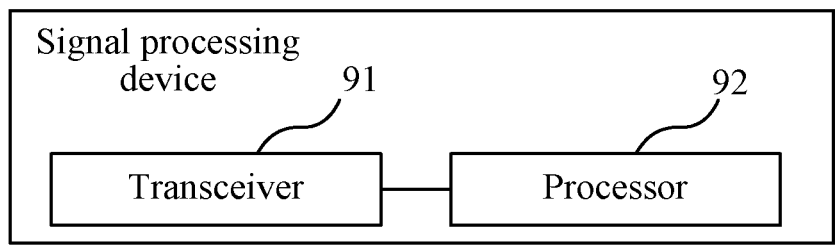
FIG. 9 is a schematic diagram of an entity structure of an embodiment of a signal processing device according to the present disclosure.

FIG. 9 is a schematic diagram of an entity structure of an embodiment of a signal processing device according to the present disclosure. As shown in FIG. 9, the signal processing device includes: a transceiver 91 and a processor 92.

The transceiver 91 is configured to: send a first data signal and receive a second data signal in a first RB of a first subframe; and further send a first reference signal according to first reference information and receive a second reference signal according to second reference information in the first RB, where the first reference signal is used for demodulating the first data signal, the second reference signal is used for demodulating the second data signal, and the first reference information is different from the second reference information.

For meanings of the first subframe and the first RB, reference may be made to the description of step 101 in Embodiment 1 of the present disclosure, which is not described herein again.

For specific examples of the first reference information being different from the second reference information, reference may be made to the descriptions in Embodiment 2 to Embodiment 4 of the present disclosure, which is not described herein again.

The processor 92 is configured to demodulate the second data signal according to the second reference signal received by the transceiver 91.

The first reference information includes: a time-frequency resource location occupied by the first reference signal, and sequence information of the first reference signal; the second reference information includes: a time-frequency resource location occupied by the second reference signal, and sequence information of the second reference signal.

Further, when the transceiver 91 is specifically configured to send the first reference signal and receive the second reference signal, the time-frequency resource location occupied by the first reference signal is the same as the time-frequency resource location occupied by the second reference signal, and the sequence information of the first reference signal is different from the sequence information of the second reference signal.

Further, when the transceiver 91 is specifically configured to send the first reference signal and receive the second reference signal, the time-frequency resource location occupied by the first reference signal is different from the time-frequency resource location occupied by the second reference signal.

Further, the transceiver 91 is specifically configured to send the first data signal and receive the second data signal by using time-frequency resources other than the time-frequency resource locations occupied by the first reference signal and the second reference signal. With reference to FIG. 5 and FIG. 6, the OFDM symbols occupied by A2, A3, A4, and A5 can be used for transmitting only the reference signals, and the data signals cannot be transmitted on these resource elements. The time-frequency resources occupied by the data signals are time-frequency resources other than time-frequency resources occupied by the first reference signal and the second reference signal.

Further, the signal processing device is a user equipment or a base station.

Further, when the signal processing device is a user equipment, the transceiver 91 is further configured to receive at least one piece of the following information sent by a base station: the time-frequency resource location occupied by the first reference signal, the sequence information of the first reference signal, the time-frequency resource location occupied by the second reference signal, and the sequence information of the second reference signal.

Further, the processor 92 is further configured to: when the sequence information of the first reference signal received by the transceiver 91 from the base station is a cyclic shift of a sequence of the first reference signal, obtain a cyclic shift of a sequence of the second reference signal by calculation according to the cyclic shift of the sequence of the first reference signal and preset relationship information;

or is configured to: when the sequence information of the second reference signal received by the transceiver from the base station is a cyclic shift of a sequence of the second reference signal, obtain a cyclic shift of a sequence of the first reference signal by calculation according to the cyclic shift of the sequence of the second reference signal and preset relationship information;

or is configured to: when the transceiver receives the time-frequency resource location occupied by the first reference signal from the base station, obtain the time-frequency resource location occupied by the second reference signal by calculation according to the time-frequency resource location occupied by the first reference signal and preset relationship information;

or is configured to: when the transceiver receives the time-frequency resource location occupied by the second reference signal from the base station, obtain the time-frequency resource location occupied by the first reference signal by calculation according to the time-frequency resource location occupied by the second reference signal and preset relationship information.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A signal processing method, comprising:
   sending a first data signal;
   receiving a second data signal;
   sending a first reference signal according to first reference information; and
   receiving a second reference signal according to second reference information,
   wherein the first reference signal is for demodulating the first data signal, and the second reference signal is for demodulating the second data signal,
   wherein the first reference information comprises a time-frequency resource location occupied by the first reference signal, and sequence information of the first reference signal,
   wherein the second reference information comprises a time-frequency resource location occupied by the second reference signal, and sequence information of the second reference signal, and
   wherein the time-frequency resource location occupied by the first reference signal is the same as the time-frequency resource location occupied by the second reference signal.

2. The signal processing method according to claim 1, wherein the sequence information of the first reference signal is different from the sequence information of the second reference signal.

3. The signal processing method according to claim 1, wherein the first reference information is different from the second reference information.

4. The signal processing method according to claim 2, wherein the sending the first data signal and the receiving the second data signal uses time-frequency resources other than the time-frequency resource locations occupied by the first reference signal and the second reference signal.

5. The signal processing method according to claim 1, wherein the first reference information and the second reference information are preset.

6. The signal processing method according to claim 1, wherein at least one piece of the following information is sent by a base station:
   the time-frequency resource location occupied by the first reference signal, the sequence information of the first reference signal, the time-frequency resource location occupied by the second reference signal, and the sequence information of the second reference signal.

7. The signal processing method according to claim 1, wherein:
   the time-frequency resource location occupied by the first reference signal is sent by a base station, and the time-frequency resource location occupied by the second reference signal is obtained according to the time-frequency resource location occupied by the first reference signal and preset relationship information; or the time-frequency resource location occupied by the second reference signal is sent by a base station, and the time-frequency resource location occupied by the first reference signal is obtained according to the time-frequency resource location occupied by the second reference signal and preset relationship information.

8. A signal processing device, comprising:
a processor; and
a memory coupled to the processor, the memory storing instructions that, when executed by the processor, cause the signal processing device to perform steps comprising:
sending a first data signal;
receiving a second data signal;
sending a first reference signal according to first reference information; and
receiving a second reference signal according to second reference information,
wherein the first reference signal is for demodulating the first data signal, and the second reference signal is for demodulating the second data signal,
wherein the first reference information comprises a time-frequency resource location occupied by the first reference signal, and sequence information of the first reference signal,
wherein the second reference information comprises a time-frequency resource location occupied by the second reference signal, and sequence information of the second reference signal, and
wherein the time-frequency resource location occupied by the first reference signal is the same as the time-frequency resource location occupied by the second reference signal.

9. The signal processing device according to claim 8, wherein the sequence information of the first reference signal is different from the sequence information of the second reference signal.

10. The signal processing device according to claim 8, wherein the first reference information is different from the second reference information.

11. The signal processing device according to claim 9, wherein the steps of sending the first data signal and receiving the second data signal are performed by using time-frequency resources other than the time-frequency resource locations occupied by the first reference signal and the second reference signal.

12. The signal processing device according to claim 8, wherein the signal processing device is a user equipment or a base station.

13. The signal processing device according to claim 8, wherein at least one piece of the following information is sent by a base station:
the time-frequency resource location occupied by the first reference signal, the sequence information of the first reference signal, the time-frequency resource location occupied by the second reference signal, and the sequence information of the second reference signal.

14. The signal processing device according to claim 8, wherein:
the time-frequency resource location occupied by the first reference signal is sent by a base station, and the time-frequency resource location occupied by the second reference signal is obtained according to the time-frequency resource location occupied by the first reference signal and preset relationship information, or
the time-frequency resource location occupied by the second reference signal is sent by a base station, and the time-frequency resource location occupied by the first reference signal is obtained according to the time-frequency resource location occupied by the second reference signal and preset relationship information.

15. A non-transitory computer-readable storage medium storing instructions that, when executed by a computer, cause the computer to perform steps comprising:
sending a first data signal;
receiving a second data signal;
sending a first reference signal according to first reference information; and
receiving a second reference signal according to second reference information,
wherein the first reference signal is for demodulating the first data signal, and the second reference signal is for demodulating the second data signal,
wherein the first reference information comprises a time-frequency resource location occupied by the first reference signal, and sequence information of the first reference signal,
wherein the second reference information comprises a time-frequency resource location occupied by the second reference signal, and sequence information of the second reference signal, and
wherein the time-frequency resource location occupied by the first reference signal is the same as the time-frequency resource location occupied by the second reference signal.

16. The non-transitory computer-readable storage medium according to claim 15, wherein the sequence information of the first reference signal is different from the sequence information of the second reference signal.

17. The non-transitory computer-readable storage medium according to claim 15, wherein the first reference information is different from the second reference information.

18. The non-transitory computer-readable storage medium according to claim 16, wherein:
sending the first data signal and receiving the second data signal by using time-frequency resources other than the time-frequency resource location occupied by the first reference signal and the second reference signal.

19. The non-transitory computer-readable storage medium according to claim 15, wherein at least one piece of the following information is sent by a base station:
the time-frequency resource location occupied by the first reference signal, the sequence information of the first reference signal, the time-frequency resource location occupied by the second reference signal, and the sequence information of the second reference signal.

20. The non-transitory computer-readable storage medium according to claim 15, wherein:
the time-frequency resource location occupied by the first reference signal is sent by the base station, the time-frequency resource location occupied by the second reference signal is obtained according to the time-frequency resource location occupied by the first reference signal and preset relationship information, or
the time-frequency resource location occupied by the second reference signal is sent by the base station, the time-frequency resource location occupied by the first reference signal is obtained according to the time-frequency resource location occupied by the second reference signal and preset relationship information.

* * * * *

UNITED STATES PATENT AND TRADEMARK OFFICE
CERTIFICATE OF CORRECTION

PATENT NO. : 10,992,445 B2  Page 1 of 1
APPLICATION NO. : 16/517234
DATED : April 27, 2021
INVENTOR(S) : Zhang et al.

It is certified that error appears in the above-identified patent and that said Letters Patent is hereby corrected as shown below:

On the Title Page

Page 2: Item (56) U.S. Patent Documents: Citation 28: "2014/0269593 A1 1/2014 Wang et al." should read -- 2014/0269593 A1 9/2014 Wang et al. --.

Signed and Sealed this
Seventeenth Day of May, 2022

Katherine Kelly Vidal
*Director of the United States Patent and Trademark Office*